United States Patent [19]

Takahashi

[11] 4,244,219
[45] Jan. 13, 1981

[54] LIQUID-LEVEL METER

[75] Inventor: Isao Takahashi, Fujimi, Japan

[73] Assignee: Sakura Instrument Co. Ltd., Tokyo, Japan

[21] Appl. No.: 964,298

[22] Filed: Nov. 28, 1978

[30] Foreign Application Priority Data

Dec. 21, 1977 [JP] Japan .................................. 52/154064

[51] Int. Cl.³ ............................................. G01F 23/10
[52] U.S. Cl. ..................................... 73/309; 33/126.6; 73/321; 73/313
[58] Field of Search ...................... 73/304 C, 321, 309; 361/178, 292, 284; 33/126.6

[56] References Cited

U.S. PATENT DOCUMENTS

| | | | |
|---|---|---|---|
| 2,766,623 | 10/1956 | DeGiers | 361/284 X |
| 3,319,476 | 5/1967 | MacKenzie | 73/321 X |
| 3,482,447 | 12/1969 | Bennett | 73/321 |
| 3,517,282 | 6/1970 | Miller | 361/292 X |
| 3,685,358 | 8/1972 | Hubner et al. | 73/321 |
| 4,065,968 | 1/1978 | Sunagawa | 73/321 X |

OTHER PUBLICATIONS

Publication: "Electromagnetic Fields, Energy, and Forces", Robert M. Fano et al., Lib. of Congress No. 60-6453 (1960) pp. 246-249.

Publication: "Radio Shack Dictionary of Electronics", R. F. Gray, 1974-1975, pp. 80, 226.

Primary Examiner—Daniel M. Yasich

[57] ABSTRACT

A liquid level meter having a first and second rotatable shaft mounted within a housing coaxially one within the other and coupled for relative rotation. A drum is mounted on one shaft and has a float suspended therefrom, for engagement with the liquid. Detecting means for sensing the torque on the drum is provided comprising an energy source and an energy receiver and a pair of relatively movable shield means located therebetween. One of the shield means is conjointly movable with one shaft and the other shield means is conjointly movable with the second shaft. Each of the shield means has spaced apertures aligned respectively with each other to permit selective passage of energy between the source and receive depending upon the degree of relative movement of the shield plates. A signal is produced in response to the sensing of energy variation which operates a motor coupled to one shaft to drive the same and consequently to rotate the other shaft in the direction of the torque exerted on the drum. An indicator showing the level of liquid in response to the degree of movement of the motor is also provided.

10 Claims, 17 Drawing Figures

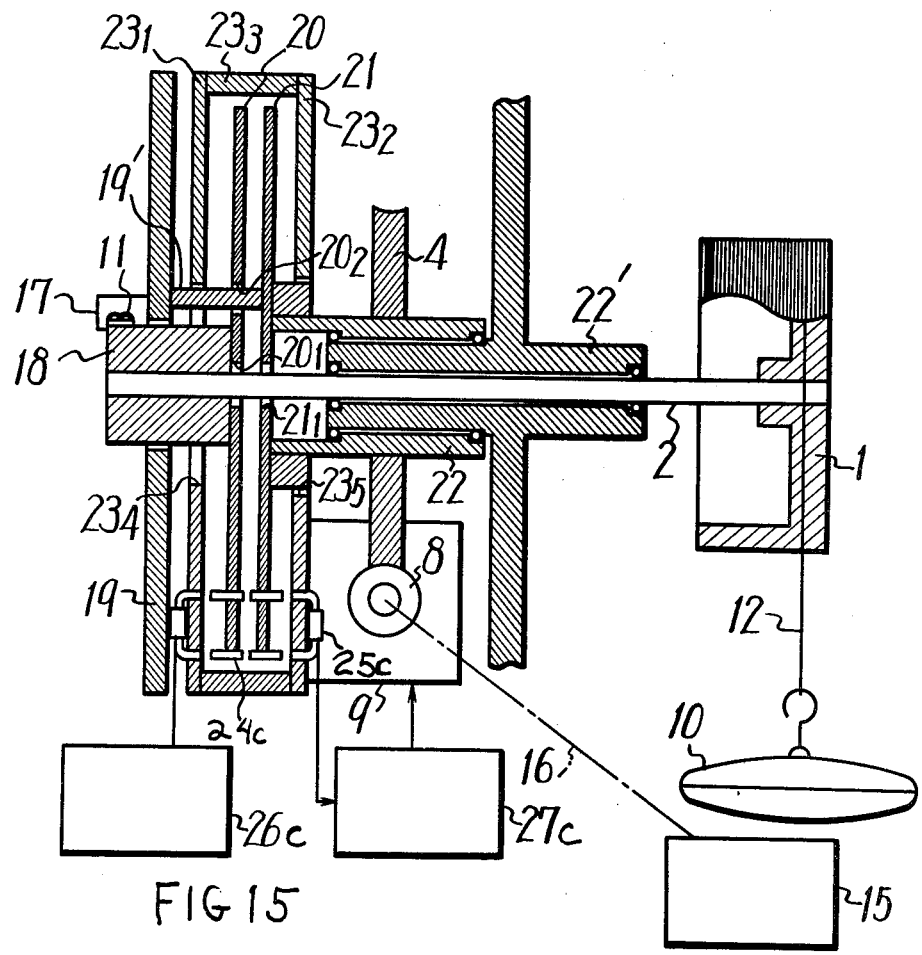
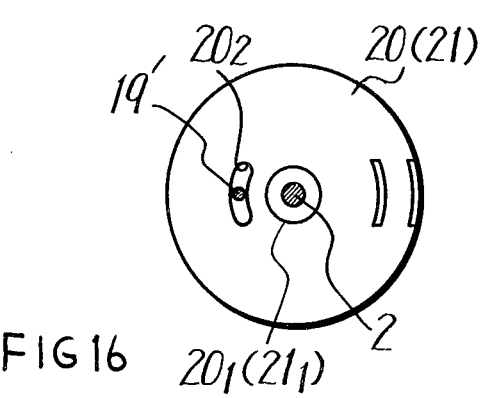
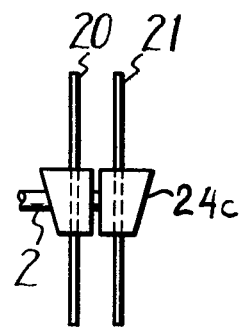

LIQUID-LEVEL METER

BACKGROUND OF THE INVENTION

1. Field of the Invention

The present invention relates generally to a liquid-level meter and is directed more particularly to a liquid-lever meter in which variations of liquid level is converted into the variation of torque, which are then detected electrically.

2. Description of the Prior Art

A prior liquid level meter is normally constructed as shown in FIG. 1, in which a drum 1, a drum shaft 2 and a movable contact 5 are integrally coupled together. Slip rings are mounted on one side of a worm wheel 4 and fixed contacts 6 and 7, which are spaced from each other, are mounted on the other side in cooperation with the contact 5. The drum shaft 2 and the worm wheel 4 are coaxially mounted to be freely rotatable relative to each other. The shaft 2 and worm wheel 4 are resiliently coupled to each other by means of a spring 11 which is stretched between a spring stop 17 fixed to the worm wheel 4 and another spring stop 18 fixed to the drum shaft 2, which stop 18 also holds the movable contact 5. A pair of springs are used in practice although only one spring 11 is shown in this example for the sake of brevity. The worm wheel 4 meshes with a worm 8, which is rotatably driven by a motor 9. A wire 12 is wound on the drum 1 to suspend a displacer 10 at its free end.

When the displacer 10 is floated on a liquid surface to be measured (not shown), the tension of the spring 11 is selected so as to be balanced with the force or torque rotating the drum shaft 2 through the gravitational action on the wire 12. At this time, the movable contact 5 is arranged to be at the neutral position between the fixed contacts 6 and 7 so as not to contact with either of them, and the motor 9 is kept in a non-rotatable condition.

Now, if the liquid surface as lowered, the displacer 10 remains in the air making its buoyancy null. Accordingly, the gravitational force tending to rotate the drum shaft 2 clockwise (in a direction indicated by an arrow $a_1$ in FIG. 1) becomes greater than the tension of the spring 11 so that the drum shaft 2 is in fact rotated rightward relative to the worm wheel 4. As a result, the movable contact 5 is brought into contact with one of the fixed contacts, namely the contact 7 in the example of FIG. 1, so that the power source AC is made to supply a current through slip rings 3 and brushes 13 through a control circuit 14 to the motor 9. Thus, the control circuit 14 is actuated to supply a current to the motor 9 turning the worm wheel 4 via the worm 8 and accordingly the drum 1 in the right direction, or in the direction shown by arrow $a_1$. The rightward rotation of the drum 1 causes the wire 12 to move downwards to lower the displacer 10. When the displacer 10 reaches the liquid surface, the movable contact 5 is detached from the fixed contact 7 to open the above-mentioned closed circuit so that the motor 9 stops its rotation and the liquid-level meter is returned to its balanced condition as described above. On the contrary, when the liquid surface rises, the displacer 10 sinks into the liquid so that its buoyancy is increased. Therefore, the force acting on the drum shaft 2 is reversed and the movable contact 5 is brought into contact with the other fixed contact 6 and the power source AC is consequently caused to supply a reverse current through the control circuit 14 to the motor 9 to rotate it in such a direction as to lift up the displacer 10. Thereafter, when the balanced condition is again obtained, the motor 9 stops its operation.

In the prior art liquid-level meter as described above, the mechanically operable electric contacts 5 to 7 are used and the slip rings 3 and brushes 13 are also required in order to detect the variation of torque acting on the drum shaft 2, these mechanical components i.e. contacts, slip rings and brushes, are liable to wear. In addition, it is difficult for the space between the movable contact 5 and the fixed contact 6 or 7 to be made so small and hence the variation of torque acting on the drum shaft 2 can not be detected unless the torque variation are to some extent rather great. As a result, there is a drawback such that the sensibility of detecting the torque variation, and accordingly the sensibility to be required for the liquid-level meter, are limited. In FIG. 1, 15 designates a liquid level indicator provided in connection with the worm 8 through a belt 16 to indicate a level of the liquid.

SUMMARY OF THE INVENTION

Accordingly, it is a main object of this invention to provide a liquid-level meter which is free from the above drawbacks of the prior art.

It is another object of this invention to provide an improved liquid-level meter in which any variation of torque is detected in non-contact manner and then converted into the corresponding electrical signal.

According to the main feature of this invention, a liquid-level meter is provided comprising a displacer adapted to float on a liquid whose level is to be measured is suspended, a wire fixed at one end to the displacer and at the other end to a drum, the drum is fixed to a drum shaft extending coaxially through a drive shaft which is coupled to a drive motor by a coupling device. A spring couples the drum shaft to the drive shaft. A liquid-level indicator is coupled with the coupling device, and a device for detecting a variation of torque exerted on the drum shaft caused by level change of the liquid in non-contact manner is provided. A circuit providing an electric signal in response to the torque variation and supplying the electric signal to the motor so as to cause the drum to rotate in a direction of the torque variation is provided whereby a balanced state of the torque with the spring can be obtained. An indicator for indicating a level of the liquid in accordance with rotation of the motor may also be provided.

The above, and other objects, features and advantages of the invention will appear more fully hereinafter from a consideration of the following description taken in connection with the accompanying drawings wherein one example is illustrated by way of example and through which the like elements are marked with the same reference numerals.

BRIEF DESCRIPTION OF THE DRAWINGS

FIGS. 15–17 are views similar to FIGS. 12–14, respectively, showing the use of coils as an energy source.

DESCRIPTION OF THE PREFERRED EMBODIMENT

A description will hereinafter be given on one embodiment of this invention with reference to FIGS. 2 through 6.

Figure 1:
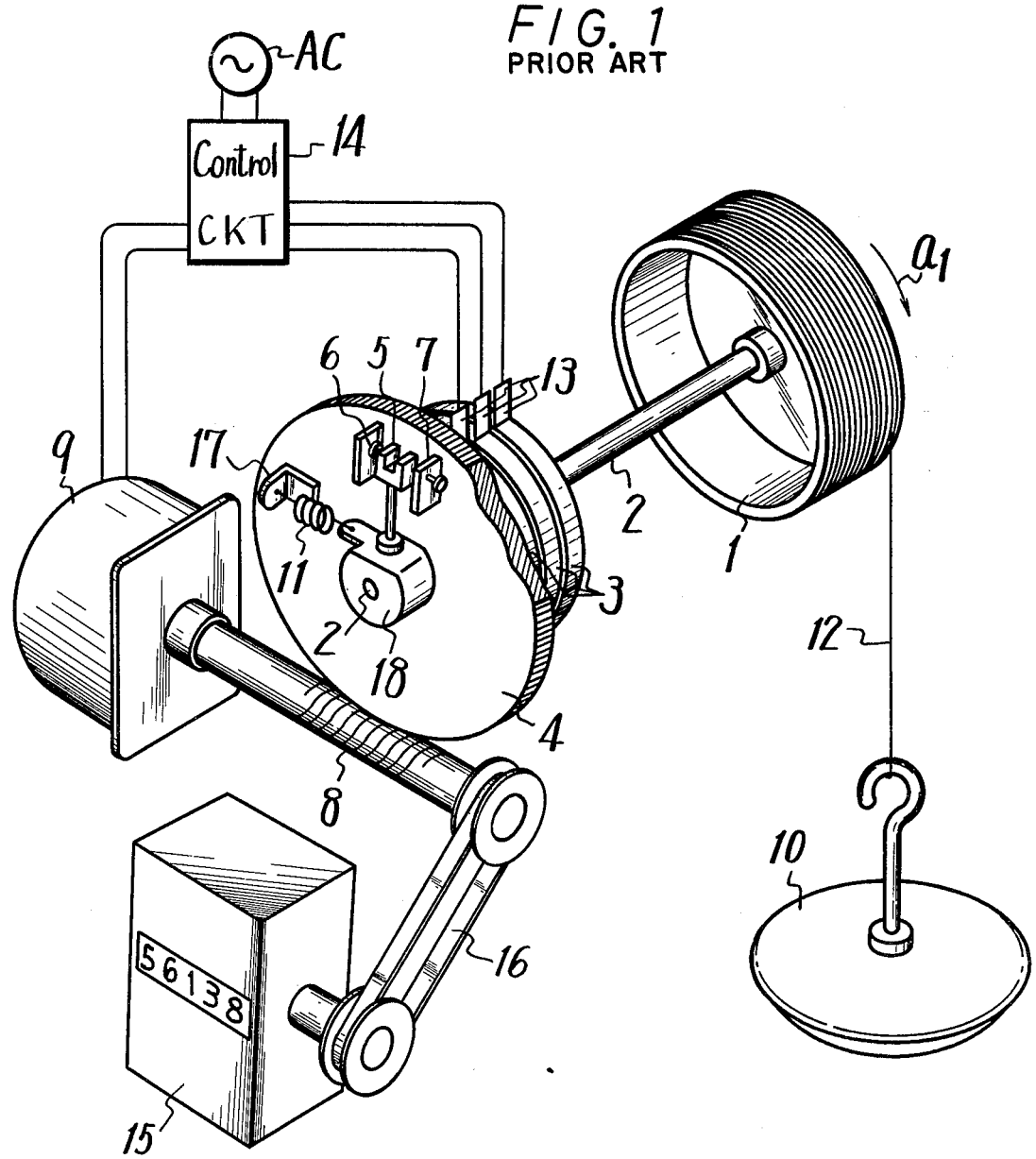
FIG. 1 is a perspective view showing a prior art liquid-level meter.
Figure 2:
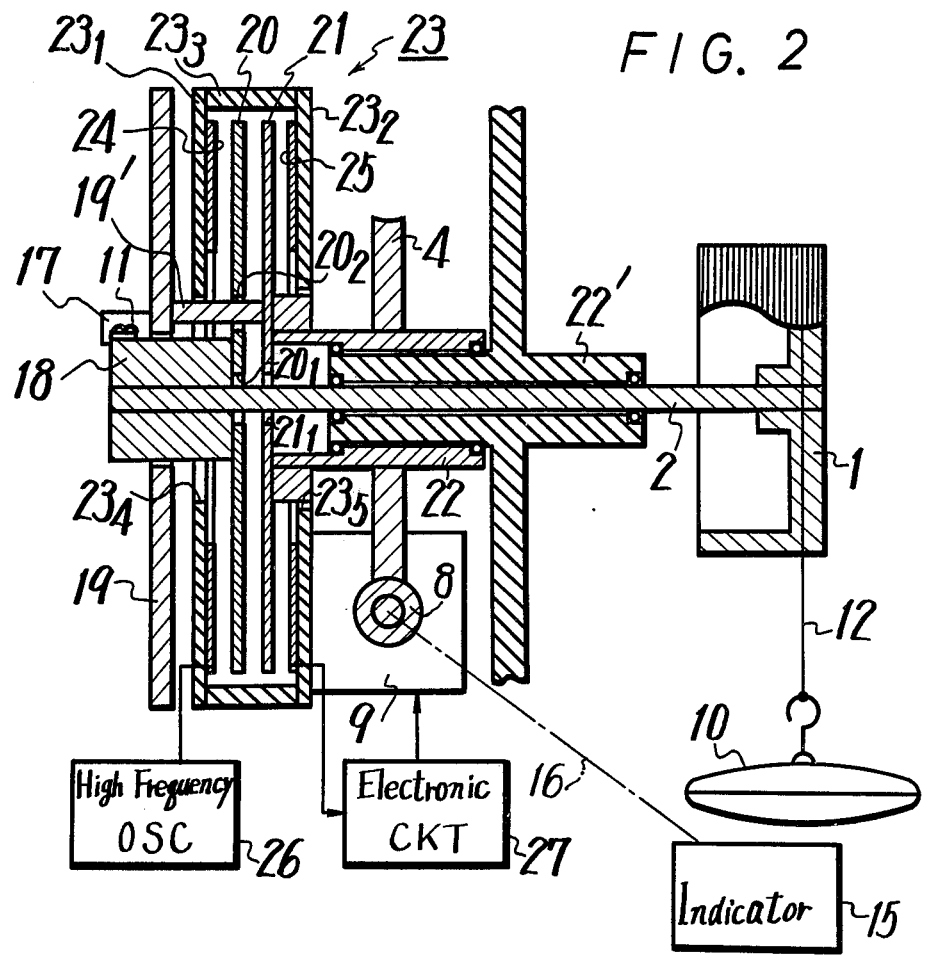
FIG. 2 is a view, mainly in vertical section, showing one example of a liquid-level meter according to this invention.

FIG. 2 is a vertical-sectional view showing one embodiment of a liquid-level meter according to this invention, in which elements corresponding to those in FIG. 1 are shown by the same reference numerals with their description being omitted. In this embodiment, a pair of shield plates 20 and 21 (made of insulating material) serving as an electrostatic capacitance varying device, which will be described later, are respectively, fixedly mounted on the hub 18 of the drum shaft 2 and a drive shaft 22 to which the worm wheel 4 is mounted, so that the spring 11 is stretched between the hub 18 serving as a spring stop which fixed to the drum shaft 2 and the spring stop 17 fixed to a spring mounting plate 19 which is coupled to the axle 22 of worm wheel 4 by the member 19. The pair of shield plates 20 and 21 are constructed in such a manner that shield plate 20 is fixed to the spring stop 18 and accordingly to the drum shaft 2 to be rotated therewith, and the shield plate 21 is fixed to the sleeve-like drive shaft 22. This drive shaft 22 is coaxially arranged about the drum shaft 2 and and freely rotatable around a bearing member 22' comprising part of a housing through which the drum shaft 2 is rotatably inserted. The worm wheel 4 is secured to the outside of the drive shaft 22. Further, the shield plate 21 and the spring mounting plate 19 are integrally coupled through at least one rod member 19'. Accordingly, the drum shaft 2 and the drive shaft 22 are resiliently coupled to each other through the spring 11 so that they are freely rotatable relative to each other under the influence of the tensile strength of the spring 11.

In FIG. 2, a cover 23 which is formed so as to cover the shield plates 20 and 21 in a spaced manner therefrom as illustrated is secured to the fixed housing member (not shown) so as not to be rotatable. The cover 23 is composed of two side disc members $23_1$ and $23_2$ and a cylinder member $23_3$ which connects the outer peripheries of the side disc members $23_1$ and $23_2$, all being made from insulating material. The disc members $23_1$ and $23_2$ are bored at the center thereof with opertures $23_4$ and $23_5$ so that the drive shaft 22 and the like can freely rotate therethrough. On the inner surface of the disc member $23_1$ of the cover 23 opposite to the shield plate 20 and at a clearance therewith, there is fixed a disc-like exciting electrode 24, and on the inner surface of the disc member $23_2$ thereof opposite to the shield plate 21 and at a clearance therewith, there is similarly fixed a disc-like receiving electrode 25. These electrodes 24 and 25 are respectively formed in a ring shape to serve as variable capacitance elements together with the interposed shield plates 20 and 21. The exciting electrode 24 is connected to a high frequency oscillator 26 of, for example, 10 $KH_z$ to generate electric lines of force, and the receiving electrode 25, receiving the electric lines of force which pass through the shield plates 20 and 21, is connected to an electronic circuit 27. The output of the electronic circuit 27 is fed to the driving motor 9 to control its rotating direction and speed. The rotary shaft of the motor 9 is integrally coupled with the worm 8, which meshes with the worm wheel 4 and also coupled to an indicator 15 through a belt coupling 16.

Figure 3:
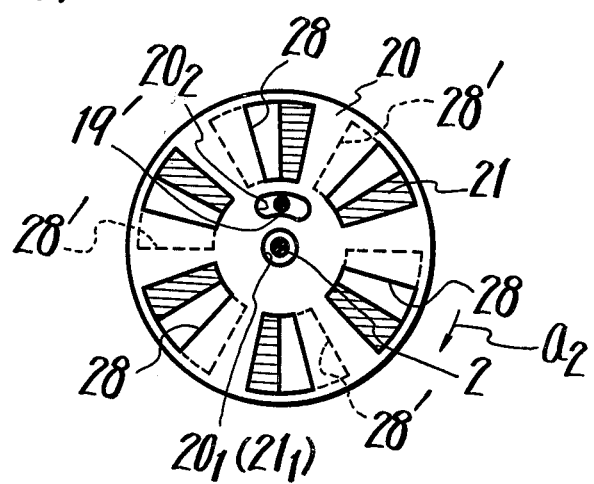
FIG. 3 is a view illustrating the shield plates used in the example of FIG. 2.

As shown in FIG. 3, the shield plates 20 and 21 are provided at the center thereof with bores $20_1$ and $21_1$ through which the drum shaft 2 can be rotatably inserted. The shield plates 20 and 21 are also provided at each intermediate portion with a plurality of radial slits or sectoral apertures 28 and 28' which are arranged with the same interval between adjacent ones and are substantially equal in configuration to one another. The shield plate 20 is also provided at a portion between its radial slit region and center bore $20_1$ with at least one elongate or arcuate aperture $20_2$ through which the rod member 19' fixed to the shield plate 21 is inserted so that the shield plates 20 and 21 can make a relative rotation to thereby adjust the opening area formed by the cooperation of both slits 28 and 28'. In FIG. 3, the shield plate 21 is shown by hatched lines at its portion visible through the slit 28 of the shield plate 20. Further, these shield plates 20 and 21 are both connected to a grounded potential. The remaining construction of the liquid-level meter of the invention is substantially the same as shown in FIG. 1.

Operation of the above-mentioned example of this invention will be described. When the displacer 10 is floated on the liquid surface, the torque exerted on the drum shaft 2 by the displacer 10 is balanced with the tension of the spring 11 as in the prior example. At this time, each opening area formed by respective slits 28 and 28' of the shield plates 20 and 21 is arranged to be substantially half of each slit area as shown in FIG. 3. Accordingly, the electric lines of force emitted from the exciting electrode 24 are passed through the above-mentioned open areas of the slits 28 and 28' to the receiving electrode 25. Since the electrostatic capacitance established between the electrodes 24 and 25 is proportional to the number of electric lines of force reaching the electrode 25 from the electrode 24, the electronic circuit 27 connected to the electrode 25 is arranged to convert the electrostatic capacitance into a corresponding electric signal. The level of this electric signal from the electronic circuit 27 at the above state (which is taken as, for example, a reference voltage $V_B$) is established so as to make the motor 9 non-rotatable.

Now, if the liquid surface is lowered, by way of example, the displacer 10 remains in the air decreasing its buoyancy. Therefore, the torque exerted on the drum shaft 2 through the wire 12 becomes greater than the tension of the spring 11 so that the shaft 2 is rotated rightward or clockwise as in the prior example. Thus, the shield plate 20 coupled to the shaft 2 is rotated in the right direction, or in the direction of an arrow $A_2$ of FIG. 3, relative to the shield plate 21. As a result, the open area between both shield plates 20 and 21 through the slits 28 and 28' is decreased, so that the number of electric lines of force passing through the slits 28 and 28' between the electrodes 24 and 25 is decreased thus reducing the electrostatic capacitance therebetween. The electronic circuit 27 operates to convert this capacitance variation (reduction) into an electric signal, which is then delivered to the motor 9 to rotate the motor 9 and accordingly the drive shaft 22 rightwards or clockwise. This rotation of drive shaft 22 is transmitted through coupling members such as the spring 11 and the like to the shaft 2 and accordingly to the drum 1 to rotate it clockwise. When the displacer 10 is thus lowered to the liquid surface and again floated thereon, the tension of the spring 11 acts to restore the open area between respective slits 28 and 28' of the shield plates 20 and 21 to half of each slit area, which is the balanced condition. Accordingly, the motor 9 stops its rotation and the balanced condition is maintained. At this time, the indicator 15 coupled to the worm 8 is also operated to indicate the liquid level in a digital manner.

On the contrary, when the liquid surface rises and hence the torque acting on the drum shaft 2 is decreased, the shield plate 20 rotates counterclockwise relative to the shield plate 21 to enlarge the opening area formed by the slits 28 and 28' and consequently increasing the electrostatic capacitance between the electrodes 24 and 25. The electronic circuit 27 produces a signal for rotating the motor 9 in a direction such as to raise the displacer 10. When the above signal is supplied to the motor 9 and the displacer 10 comes up to the liquid surface, the motor 9 stops its rotation, and the balanced condition is again maintained. The the liquid level at this time is digitally indicated by the indicator 15.

Figure 4:
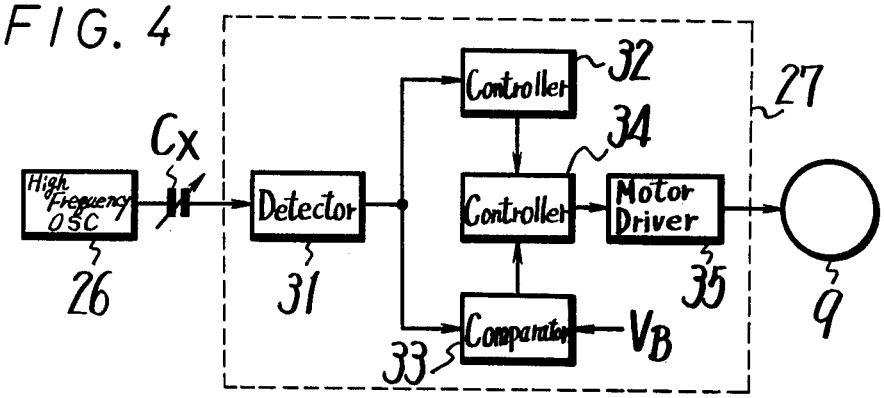
FIG. 4 is a block diagram showing an electric system used in the example of FIG. 2.

FIG. 4 is a block diagram of the electronic system used in the apparatus shown in FIG. 2. In FIG. 4, elements corresponding to those in FIG. 2 are shown by the same reference numerals. The electronic circuit 27 comprises a capacitance detector 31 connected through the electrodes 25 and 24 (a variable capacitance element indicated by $C_x$) to the high frequency oscillator 26, a motor speed controller 32 fed with the output of the detector 31, a comparator 33 similarly fed with the output of the detector 31, a motor rotating direction controller 34 applied with the outputs of the controller 32 and comparator 33, and a motor driving circuit 35 supplied with the output of the controller 34. The capacitance detector 31 serves to convert a detected electrostatic capacitance into a corresponding DC voltage, and the motor speed controller 32 is supplied with the output voltage of the detector 31 to convert it into a signal for controlling the speed of the motor 9, which is then applied to the controller 34. Meanwhile, the comparator 33 serves to discriminate the clockwise and counterclockwise rotations of the motor 9. In other words, the comparator 33 is supplied with the output voltage of the capacitance detector 31 to compare it with the aforesaid reference voltage $V_B$ of the balanced condition. When the output voltage of the detector 31 is higher than the reference voltage $V_B$, the comparator 33 produces a discrimination signal for the counterclockwise rotation of the motor 9, or the rising motion of the displacer 10. On the other hand, when the output voltage of the detector 31 is lower than the reference voltage $V_B$, the comparator 33 produces a discrimination signal for the clockwise rotation of the motor 9, or the falling motion of the displacer 10. These signals are applied to the motor rotating direction controller 34 which is thus fed with the above speed controlling signal and discrimination signal to produce a signal controlling the rotating direction and speed of the motor 9, and this signal is supplied to the motor driving circuit 35. Then, this circuit 35 supplies to the motor 9 a signal causing the motor 9 to be driven at a predetermined direction and speed.

Figure 5:
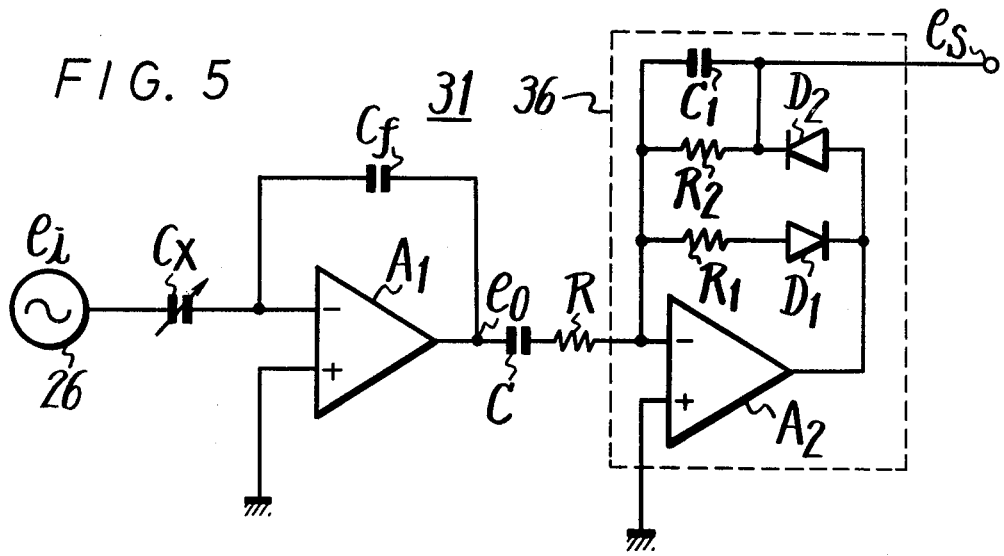
FIG. 5 is a circuit diagram showing one example of a capacitance detector used in FIG. 4.

The capacitance detector 31 can be of any type provided that it converts an electrostatic capacitance into a corresponding electric signal. One example of the capacitance detector 31 will now be described in detail with reference to FIG. 5. In FIG. 5, $A_1$ denotes an operational amplifier which is applied at its minus (−) input terminal with the output of the variable capacitance element $C_x$ and grounded at its plus (+) input terminal. Reference character $e_i$ indicates an output voltage of the high frequency oscillator 26, $C_f$ a feedback capacitor between the (−) input terminal of the amplifier $A_1$ and its output terminal, and $e_o$ an output voltage of the amplifier $A_1$. Reference numeral 36 designates a rectifier circuit consisting of an operational amplifier $A_2$, diodes $D_1$ and $D_2$, resistors $R_1$ and $R_2$ and a capacitor $C_1$, in which the (−) input terminal of the amplifier $A_2$ is supplied through a series connection of a capacitor C and a resistor R with the output voltage $e_o$ of the amplifier $A_1$ and the (+) input terminal thereof is grounded. Further, $e_s$ indicates an output voltage of the rectifier circuit 36.

Now, if the transfer function of the amplifier $A_1$ is taken as $Z_T$, the following relation is obtained.

$$Z_T = e_o/e_i = C_x/C_f$$

Accordingly, the output voltage $e_o$ of the amplifier $A_1$ is proportional to the capacitance of the variable capacitance element $C_x$. This output voltage $e_o$ is rectified by the rectifier circuit 36 to produce the output voltage $e_s$, so that the output voltage $e_s$ is eventually proportional to the capacitance of the variable capacitance element $C_x$. Since the amplification degree of the amplifier $A_1$ is selected very large, a voltage between the (+) and (−) input terminals thereof can be made very small.

Figure 6:
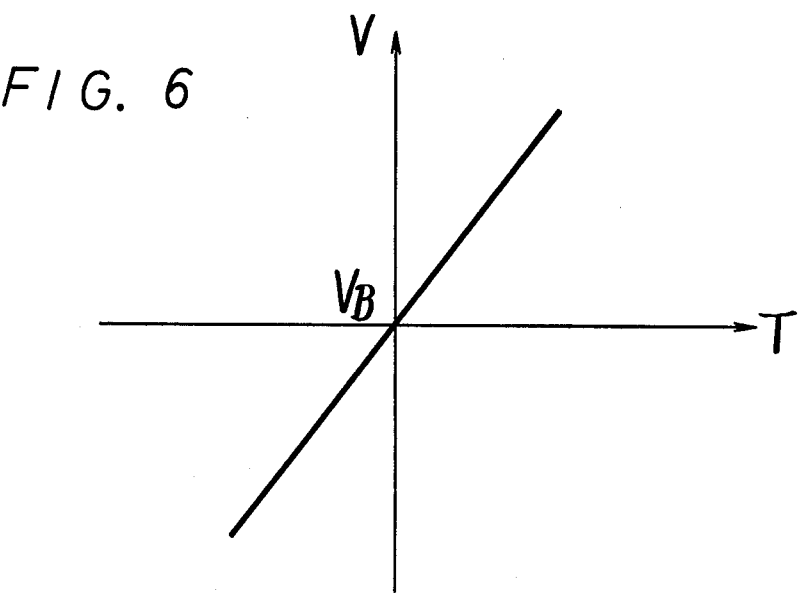
FIG. 6 is a graph showing the operation of a comparator in FIG. 4, FIGS. 7, 8 and 9 are exploded views showing another embodiments of the shield plates used in the invention.

FIG. 6 is a graph used for explaining the operation of the comparator 33 which discriminates the clockwise and counterclockwise rotations of the motor 9, or the falling and rising motions of the displacer 10. In FIG. 6, the ordinate represents a difference voltage V between the output voltage of the capacitance detector 31 and the reference voltage $V_B$, and the abscissa represents torque T applied to the motor 9. In FIG. 6, the left side of the torque T from the center indicates clockwise direction or falling direction and its right side indicates counterclockwise direction or rising direction, with the center of the ordinate indicating the reference voltage $V_B$.

As is apparent from the above description, no mechanical contact member such as movable contact, fixed contact, slip ring, brush and the like is used as in the prior art example, and consequently no portion is apt to be worn out. Besides, since the variation of torque is electronically detected in this invention, another control signal, for example, a control signal for such an abnormal state as excessive torque or broken wire can be easily produced. Further, the shape of the slit of the shield plate is not necessarily limited to a sectoral shape as illustrated but can be variously changed to provide various modes for detecting the torque.

Figure 7:
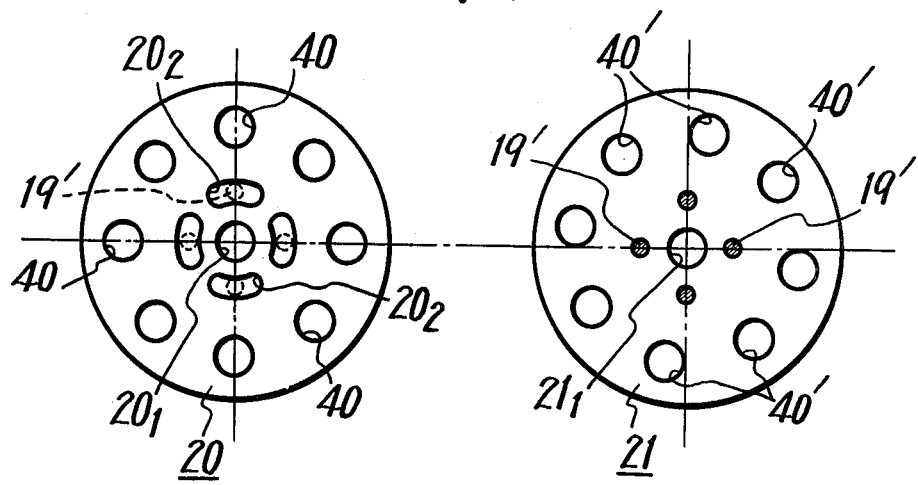

In the invention it is not necessary that the shield plates 20 and 21 are limited to those shown in FIG. 3. For example, as shown in FIG. 7, a plurality of round apertures 40 and 40' may be provided respectively in the shield plates 20 and 21 in place of the sectoral slits 28 and 28' shown in FIG. 3. In this case, four arcuate apertures $20_2$ with the angular distance of 90° between adjacent ones are bored through the shield plate 20, and hence four rods 19' may be correspondingly used.

Figure 8:
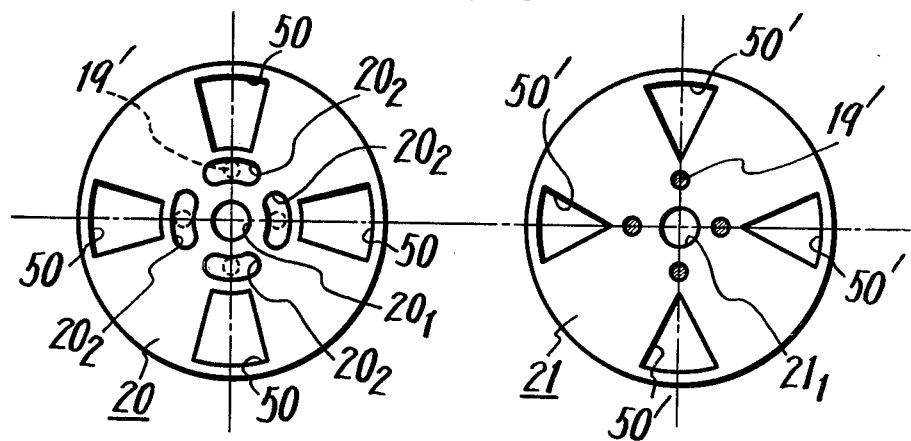

It is also possible to form a plurality of square or sectoral apertures 50 in the shield plate 20 with the same angular distance between adjacent ones and a corresponding number of triangular apertures 50' with the corresponding angular distance in the shield plate 21 as shown in FIG. 8.

Figure 9:
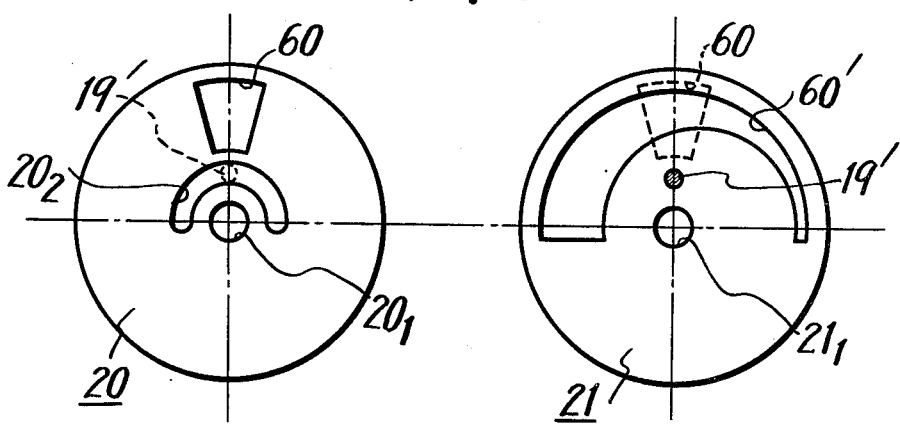

Further, it is also possible as shown in FIG. 9, if one sectoral slit 60 is provided in the shield plate 20 and a corresponding spiral aperture 60' is provided in the shield plate 21 over about a half circumference thereof with its width in the radial direction being reduced gradually along the circumferential direction of the shield plate 21. A great variation in-torque can thus be detected, covering a wide angle.

In this case, when the slit 60 corresponds to about the center of the spiral aperture 60', the above balance state is obtained.

Figure 10:
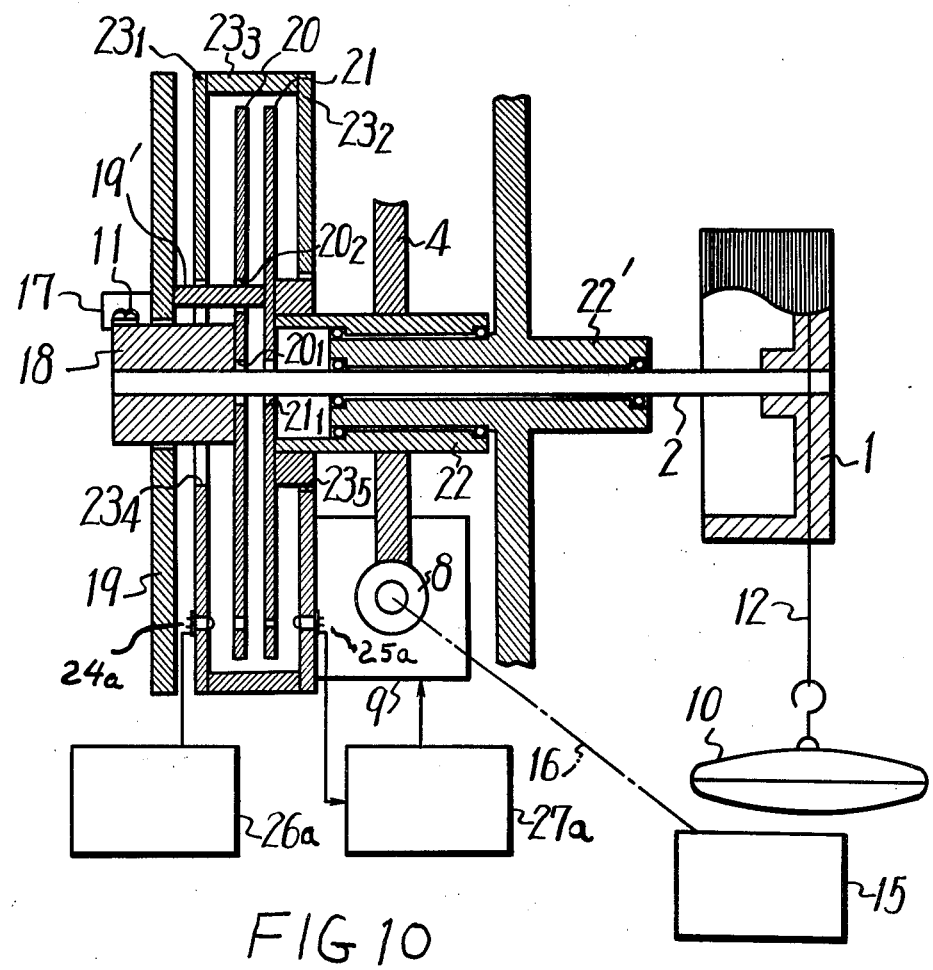
FIG. 10 is a view similar to FIG. 2 showing an embodiment of the present invention in which the energy source is light.
Figure 11:
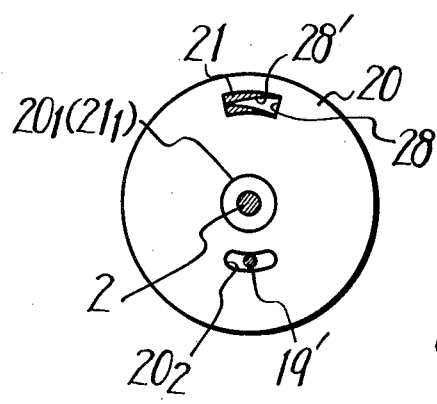
FIG. 11 is a view similar to FIG. 3 showing the shield plate employed in the embodiment of FIG. 10.

The detection of the variation exerted on the drum shaft 2, can be made by methods other than the use of electrostatic capacitance. For example, as seen in FIG. 10, the amount of light passing through the open area between the shield plates 20 and 21 may be detected by means of a light emitting element 24a (LED) powered from a source 26a impinging on a light receiving element 25a, instead of the electrodes 24 and 25. The receiving element 25a feeds an electronic circuit 27a converting the light to electrical signals. The shield plates 20 and 21 are then made of opaque material.

Figure 12:
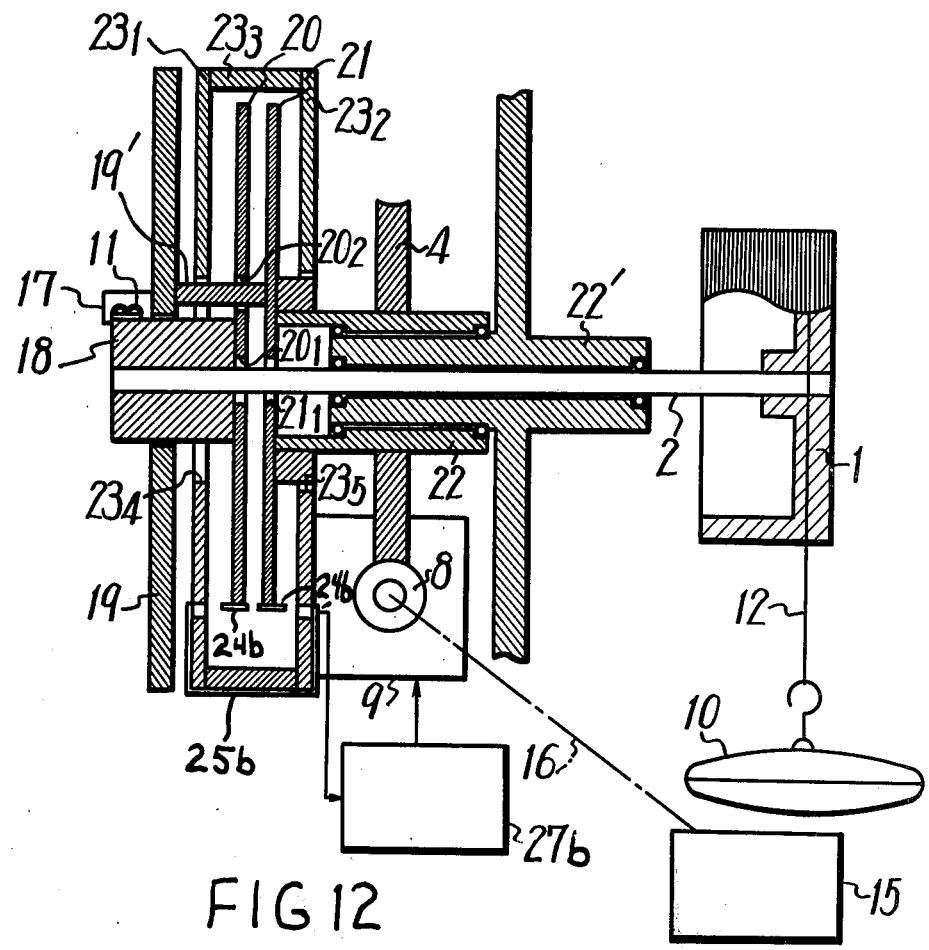
FIG. 12 is a view similar to FIG. 2 showing still another embodiment in which magnets are employed as the energy source.
Figure 13:
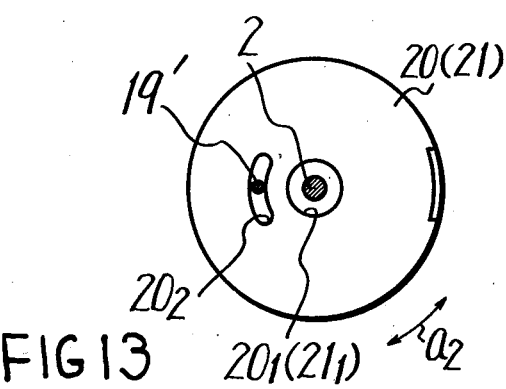
FIG. 13 is a view similar to that of FIG. 3 showing the shield plates in plan.
Figure 14:
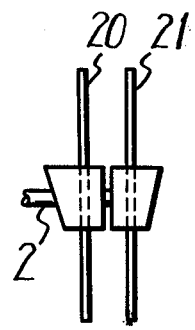
FIG. 14 is a view showing the shield plate of the embodiment of FIG. 10 in side view.

As seen in FIG. 12, the detection of variation of magnetic flux passing through the open areas between the shield plates 20 and 21 may also be employed, by the combination of a magnet 124b or electromagnet and a magnetically sensitive element 125b, provided in place of the electrodes 24 and 25, in which the shield plates 20 and 21 are made of non-magnetic material.

As seen in FIGS. 12-17, it is also possible to replace electrodes 24 and 25 by a pair of coils 24c and 25c, one being excited by an AC power source 26c, and the other serving to detect magnetic flux passing through the common slits of the shield plates 20 and 21.

It will be apparent that a number of changes and variations can be effected by one skilled in the art without departing from the scope of the novel concepts of the present invention, so that the scope of the invention should only be determined by the appended claims.

I claim as my invention:

1. A liquid level meter comprising a housing, a first and second rotatable shaft mounted within said housing coaxially one within the other, means for resiliently coupling said shafts for rotation, a drum fixedly mounted on said first shaft for conjoint rotation therewith and having a float suspended from said drum by an elongated wire, the change in buoyancy of said float exerting a torque on said drum to cause said drum to rotate, capacitor means for detecting variations in the torque exerted on said drum, said capacitor means comprising a pair of ring shaped electrodes fixedly mounted on said housing spaced from each other and charge varying means located between said electrodes, said charge varying means comprising a pair of insulating shield plates spaced from each other and from said electrodes, one of said shields being conjointly rotatable with the first shaft, the other of said shields being conjointly rotatable with the second shaft to permit selective transfer of charge between said electrodes, means for providing an electric signal in response to the transfer of charge between said electrodes, a motor coupled to said second shaft to drive the same, said motor being responsive to said electric signal to rotate said second shaft in the direction of the torque exerted on said drum to cause said resilient coupling to rotate said first shaft accordingly and means for indicating the level of liquid in response to the degree of movement of said motor.

2. A liquid-level meter as claimed in claim 1, in which each of said shield plates has formed therethrough at least one aperture, whereby when said pair shield plates are relatively rotated in response to the level variation of said liquid, a common opening area to both of the apertures of said pair of shield plates is varied and hence the capacitance formed by said pair of electrodes is varied in response to said level variation of the liquid.

3. A liquid-level meter as claimed in claim 2, in which said aperture has a sectoral shape.

4. A liquid-level meter as claimed in claim 2, in which said aperture has a round shape.

5. A liquid-level meter as claimed in claim 1, in which one of said shield plates has provided therethrough at least one sectoral aperture and the other shield plate has provided therethrough a corresponding triangular aperture.

6. A liquid-level meter as claimed in claim 1, in which one of said shield plates has povided therethrough a sectoral slit and the other shield plate has formed therethrough a spiral slit.

7. A liquid level meter comprising a first and second rotatable shaft mounted coaxially one within the other, means for resiliently coupling said shafts for rotation, a drum fixedly mounted on said first shaft having a float suspended therefrom for engagement with the liquid, the change in buoyancy of said float exerting a torque on said drum tending to rotate said drum and first shaft, detecting means for sensing the torque, comprising an energy source and an energy receiver spaced from each other, a pair of relatively movable shield means located between said source and said receiver, one of said shield means being conjointly movable with said first shaft and the other of said shield means being conjointly movable with said second shaft, said shield means having spaced apertures therein aligned respectively with each other to permit selective passage of energy between said source and receiver depending upon the degree of relative movement of said shield plates, means for providing a signal in response to the sensing of energy variation by said detecting means, a motor coupled to said second shaft to drive the same responsive to said signal to rotate said second shaft in the direction of the torque exerted on said drum to cause said resilient means to rotate said first shaft in a corresponding direction and, means for indicating the level of liquid in response to the degree of movement of said motor.

8. The liquid level meter according to claim 7, wherein said energy source is a light emitting element, the energy receiver is a photo cell and the shield means are opaque members.

9. The liquid level meter according to claim 7, wherein said energy source is a magnet, the energy receiver is a magnetosensitive element, and the shield means are magnet insulators.

10. The liquid level meter according to claim 1, wherein said energy source is a coil excited by an AC power source, said energy receiver are coil, and the shield means is a magnetic insulators.

* * * * *